Aug. 28, 1951      A. G. GOLDBERG      2,565,555
GAS VENT FOR GASOLINE FILLING SYSTEMS FOR AUTOMOBILES
Filed Sept. 1, 1949
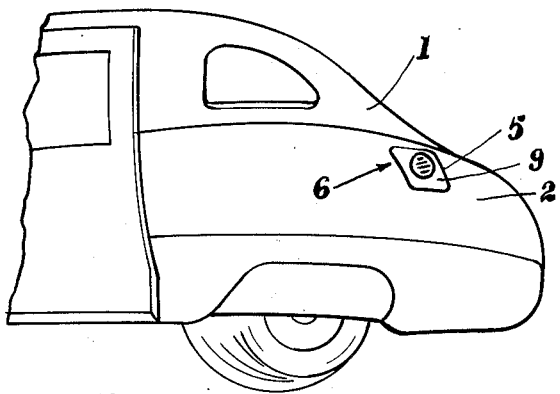
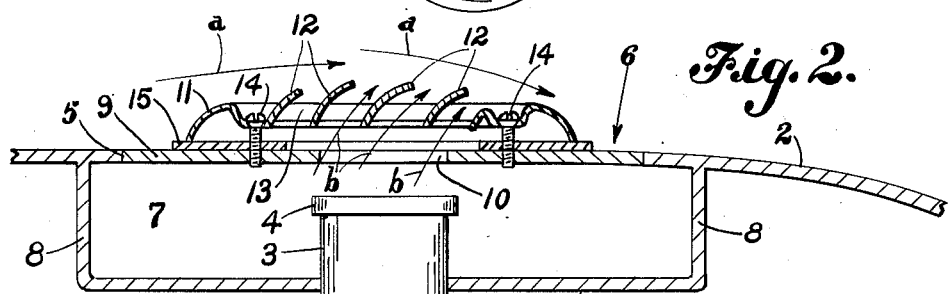
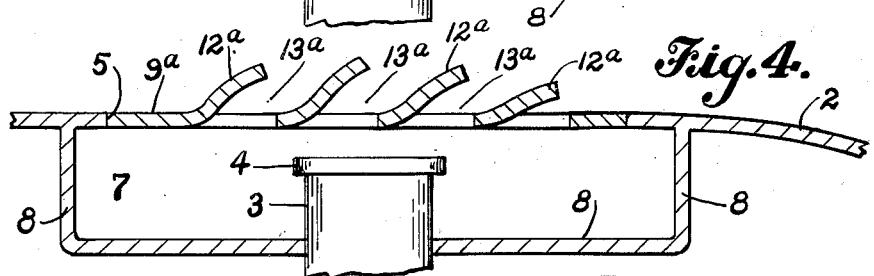
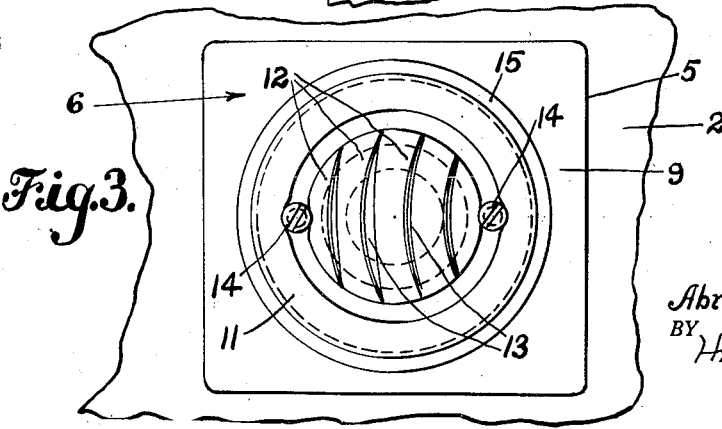
INVENTOR.
Abraham G. Goldberg.
BY Heard Smith Tennant
Attorneys.

Patented Aug. 28, 1951

2,565,555

UNITED STATES PATENT OFFICE 2,565,555

GAS VENT FOR GASOLINE FILLING
SYSTEMS FOR AUTOMOBILES

Abraham G. Goldberg, Chestnut Hill, Mass.

Application September 1, 1949, Serial No. 113,506

1 Claim. (Cl. 280—152)

This invention relates to a gas vent for gasoline filling systems of automobiles.

Automobiles are commonly provided with a filling opening in one of the rear fenders and the filling pipe through which the gas tank is filled is arranged so that the inlet end thereof is located beneath the fender and in register with the filling opening. The fender is also usually provided with a closure member for closing the filling opening, but which may be opened whenever it is desired to gain access to the filling pipe for filling the gas tank.

Many automobiles are now made with a chamber or compartment directly beneath the fender and into which the inlet end of the filling pipe projects and with which the filling opening in the fender communicates.

If in automobiles having this construction any gasoline spills into the compartment during the operation of filling the gas tank, or slops over into the compartment when the automobile is in motion, the gasoline fumes generated by such gasoline may develop objectionable or dangerous conditions. Such gas fumes may work into the interior of the automobile thus producing an obnoxious atmosphere therein, or said gas fumes within the compartment may result in an explosion.

It is, therefore, one object of my present invention to provide novel means for venting said compartment to allow the escape therefrom of any gas fumes that may develop therein.

Another object of the invention is to provide novel means whereby when the automobile is in motion, a suction condition which will be developed within said compartment which will draw out therefrom any gas fumes which may be generated therein.

In order to give an understanding of the invention, I have illustrated in the drawings a selected embodiment thereof, which will now be described, after which the novel features will be pointed out in the appended claim.

In the drawings,

Fig. 1 is a fragmentary perspective view illustrating the rear portion of an automobile and showing the closure in the rear fender for the filling opening.

Fig. 2 is a vertical sectional view showing the compartment into which the inlet end of the filling pipe projects and illustrating the manner in which this compartment is ventilated.

Fig. 3 is a plan view of the louvered cap element of the filling opening closure.

Fig. 4 is a vertical sectional view showing a different embodiment wherein the louvers are formed directly in the closure for the filling opening.

In the drawings 1 indicates a portion of an automobile and 2 one of the rear fenders thereof. 3 indicates the inlet end of the filling pipe by which the gas tank of the automobile is filled, said inlet end being situated beneath the fender 2 as usual in automobiles, said filling pipe having removably secured to its end the usual closure cap 4. The fender 2 is provided with a filling opening 5 which registers with the filling pipe and said opening is normally closed by a closure member 6 which can be opened to permit access to the filling pipe.

The automobile herein illustrated is also formed with a compartment 7 beneath the fender 2 and into which the inlet end 3 of the filling pipe extends and with which the filling opening 5 in the fener communicates. The walls which enclose such compartment are indicated at 8.

The parts thus far described are such as are commonly found in many automobiles and, except for the closure member 6 for the filling opening, form no part of the present invention. In automobiles having the above construction, it sometimes happens that gasoline becomes deposited in the compartment 7, either by being spilled into the compartment during the filling of the gas tank, or by being slopped over into the compartment from the filling pipe when the automobile is in motion and traveling over a rough road.

In either case the presence of free gasoline in the compartment 7 is a source of danger, because the fumes generated from such gasoline might result in an explosion or they might work into the interior of the automobile and thus create an unpleasant atmosphere for the occupants thereof.

As stated above my invention has for its object to provide means for venting the compartment 7 and thus maintaining it substantially free from gasoline fumes. This is accomplished herein by providing the closure member 6 with a louvered opening which communicates with the compartment 7 and which is so constructed that the individual louvers incline upwardly and backwardly so that when the automobile is in motion, the movement of the air stream over the surface of the fender creates a suction condition within the compartment by which the gasoline fumes are withdrawn therefrom.

In accordance with my invention, the closure member 6 is made with a body portion 9 which is preferably hinged to the fender in any usual way to allow the closure to be opened, and which is formed with a venting opening 10. Mounted on the body member 9 of the closure is a louvered cap member 11 which is herein shown as circular in form and which has portions 12 struck up from the central area thereof to form louver elements. These louver elements 12 slant upwardly and backwardly as shown in Fig. 2 and form between them openings 13 which communicate with the opening 10 in the body member 9.

The louvered cap member 11 may be secured to the body portion 9 in any suitable or usual way as by means of screws 14, and if desired a rubber gasket 15 may be interposed between the louvered cap member 11 and the body portion 9 of the closure member.

With this construction the opening 10 and the spaces 13 constitute an open vent for the compartment 7 and when the automobile is in motion and there is an air stream moving rapidly over the fender as indicated by the arrows a, such air stream will, in cooperation with the louvers 12, develop a suction condition within the compartment 7 which will cause gas fumes or air therein to be drawn out through the openings 13 as shown by the arrows b.

Hence with this construction the compartment 7 will be automatically cleared of any gas vapors that may accumulate therein as the automobile is moving forward.

In Fig. 4 I have shown a different embodiment of the invention wherein the louvers are formed directly in the body portion of the closure for the filling opening, the portions 12a of the body 9a being struck up to provide the individual louvers which form between them the louvered opening.

I claim:

The combination with an automobile having a filling opening in a rear fender and a compartment beneath the fender with which said filling opening communicates, a filling pipe leading to the gas tank and having its inlet end extending into said compartment, of a closure for said filling opening provided with a centrally located vent opening, a louvered cap member smaller than the closure and located on the outside thereof, said cap member having a downward turned peripheral edge portion which surrounds the vent opening in the closure and also having a central louvered portion situated above the vent opening, a gasket member interposed between said downturned peripheral edge portion and the closure, said gasket member having an opening registering with the vent opening, and attaching screws extending through the cap member between the louvered portion thereof and the peripheral edge portion and having screw threaded engagement with the closure for securing the cap member to said closure.

ABRAHAM G. GOLDBERG.

REFERENCES CITED

The following references are of record in the file of this patent:

UNITED STATES PATENTS

| Number | Name | Date |
| --- | --- | --- |
| 2,266,769 | Kramer | Dec. 23, 1941 |
| 2,474,974 | Fulton | July 5, 1949 |
| 2,474,992 | Stephenson et al. | July 5, 1949 |

FOREIGN PATENTS

| Number | Country | Date |
| --- | --- | --- |
| 214,794 | Great Britain | May 1, 1924 |
| 587,937 | Great Britain | May 9, 1947 |
| 644,967 | Germany | May 19, 1937 |